(12) United States Patent
Korb et al.

(10) Patent No.: US 7,896,024 B2
(45) Date of Patent: Mar. 1, 2011

(54) BACKPRESSURE RELIEF VALVE

(75) Inventors: Yaakov Korb, Grafton, OH (US); Dale A. Pulver, University Heights, OH (US)

(73) Assignee: Moen Incorporated, North Olmstead, OH (US)

( * ) Notice: Subject to any disclaimer, the term of this patent is extended or adjusted under 35 U.S.C. 154(b) by 859 days.

(21) Appl. No.: 11/651,957

(22) Filed: Jan. 10, 2007

(65) Prior Publication Data

US 2007/0193627 A1    Aug. 23, 2007

Related U.S. Application Data

(60) Provisional application No. 60/757,803, filed on Jan. 10, 2006.

(51) Int. Cl.
*F16L 5/00* (2006.01)

(52) U.S. Cl. .................. 137/360; 137/218; 137/860

(58) Field of Classification Search .............. 137/356, 137/357, 801, 511, 843, 860, 614.2, 625.4, 137/360, 59–62, 526, 218

See application file for complete search history.

(56) References Cited

U.S. PATENT DOCUMENTS

| | | | |
|---|---|---|---|
| 536,801 A | 4/1895 | Gaghan | |
| 2,652,224 A | 9/1953 | Noland et al. | |
| 2,686,530 A | 8/1954 | Dire | |
| 2,810,395 A | 10/1957 | Simmons | |
| 2,870,780 A | 1/1959 | Fladung | |
| 2,985,552 A | 5/1961 | Watanabe | |
| 3,138,173 A * | 6/1964 | Hartman | 137/493.8 |
| 3,175,575 A | 3/1965 | Kennedy | |
| 3,267,952 A | 8/1966 | Pletcher et al. | |
| 3,267,956 A | 8/1966 | Kline | |
| 3,369,556 A | 2/1968 | Allderdice | |
| 3,407,837 A | 10/1968 | Fulton et al. | |
| 3,451,422 A | 6/1969 | Chorkey | |
| 3,494,373 A | 2/1970 | Horak et al. | |
| 3,682,437 A | 8/1972 | Miller | |
| 3,729,021 A | 4/1973 | Humphrey | |
| 3,929,150 A * | 12/1975 | Flinner et al. | 137/218 |
| 3,943,963 A | 3/1976 | Papacek | |
| 3,952,770 A | 4/1976 | Botnick | |
| 3,971,401 A | 7/1976 | Persson | |
| 4,022,243 A | 5/1977 | Edwards | |

(Continued)

OTHER PUBLICATIONS

One (1) page from website: www.mobile-mart.com, printed on Oct. 31, 2003.

(Continued)

*Primary Examiner*—Craig M Schneider
(74) *Attorney, Agent, or Firm*—Calfee, Halter & Griswold LLP (57) ABSTRACT

A sillcock for supplying varying amounts of water at various temperatures includes a backpressure relief valve for relieving backpressure in the sillcock. The sillcock includes a sillcock tube and a valve body attached to the sillcock tube. A cartridge assembly is provided in the valve body, and an actuation assembly extends through the sillcock tube. The actuation assembly cooperates with the cartridge assembly to control the volume and temperature of water exiting the sillcock according to the axial and rotational movements of a knob. The backpressure relief valve includes a deformable member operable to allow water to be expelled from the sillcock if backpressure is present.

17 Claims, 6 Drawing Sheets

U.S. PATENT DOCUMENTS

| | | |
|---|---|---|
| 4,071,043 A | 1/1978 | Carlson |
| 4,103,701 A | 8/1978 | Jeng |
| 4,158,366 A | 6/1979 | Van Meter |
| 4,178,956 A | 12/1979 | Fillman |
| 4,182,356 A | 1/1980 | Woodford, Sr. |
| 4,206,777 A | 6/1980 | Hirsch et al. |
| 4,209,033 A | 6/1980 | Hirsch et al. |
| 4,212,319 A | 7/1980 | Krablin |
| 4,221,233 A | 9/1980 | Botnick |
| 4,234,162 A | 11/1980 | Kay |
| 4,244,394 A | 1/1981 | Hartselle, III |
| 4,286,616 A | 9/1981 | Botnick |
| 4,305,419 A | 12/1981 | Moen |
| 4,314,580 A | 2/1982 | Steinwand |
| 4,380,245 A | 4/1983 | Hefner |
| 4,469,121 A | 9/1984 | Moen |
| 4,475,570 A | 10/1984 | Pike et al. |
| 4,538,637 A | 9/1985 | Williams |
| 4,644,970 A | 2/1987 | Lowry |
| 4,657,038 A | 4/1987 | Lyons |
| 4,673,000 A | 6/1987 | Haerr et al. |
| 4,821,762 A | 4/1989 | Breneman |
| 4,836,237 A | 6/1989 | McCullough |
| 4,844,116 A | 7/1989 | Buehler et al. |
| 4,909,270 A | 3/1990 | Enterante et al. |
| 4,971,097 A | 11/1990 | Hunley et al. |
| 4,984,309 A | 1/1991 | Lowry |
| 5,012,833 A | 5/1991 | Hunley, Jr. |
| 5,029,603 A | 7/1991 | Ackroyd |
| 5,129,416 A | 7/1992 | Ackroyd |
| 5,158,105 A | 10/1992 | Conway |
| 5,275,195 A | 1/1994 | Breda |
| 5,385,330 A | 1/1995 | Joseph |
| 5,392,805 A | 2/1995 | Chrysler |
| 5,603,347 A | 2/1997 | Eaton |
| 5,608,927 A | 3/1997 | Lowry et al. |
| 5,614,119 A | 3/1997 | Ollis |
| 5,697,393 A | 12/1997 | Mirlisena, Sr. |
| 5,740,831 A | 4/1998 | DeNardo et al. |
| 5,752,542 A | 5/1998 | Hoptner, III |
| 5,762,103 A | 6/1998 | Gregoire |
| 5,797,416 A | 8/1998 | Wilcox |
| 5,819,799 A | 10/1998 | O'Dell |
| 5,842,499 A | 12/1998 | Hall |
| 5,884,661 A | 3/1999 | Plyler et al. |
| 5,927,111 A | 7/1999 | Nachbauer |
| 5,947,150 A | 9/1999 | Ryan |
| 5,964,246 A | 10/1999 | Meeker |
| 6,065,491 A | 5/2000 | Rider |
| 6,116,265 A | 9/2000 | Drake |
| 6,134,722 A | 10/2000 | Lowry et al. |
| 6,135,359 A | 10/2000 | Almasy et al. |
| 6,142,172 A | 11/2000 | Shuler et al. |
| 6,158,455 A | 12/2000 | Marshall et al. |
| 6,206,039 B1 | 3/2001 | Shuler et al. |
| 6,216,722 B1 | 4/2001 | Solomon |
| 6,234,205 B1 | 5/2001 | D'Amelio et al. |
| 6,298,873 B1 | 10/2001 | LeVey et al. |
| 6,386,223 B1 | 5/2002 | Hoptner, III |
| 6,394,125 B2 | 5/2002 | White |
| 6,435,064 B1 | 8/2002 | Persechino |
| 6,532,986 B1 | 3/2003 | Dickey et al. |
| D481,106 S | 10/2003 | Pelletz |
| 6,668,852 B1 | 12/2003 | Williamson |
| 6,679,473 B1 | 1/2004 | Ball |
| 6,761,183 B1 * | 7/2004 | Hoeptner, III ............... 137/218 |
| 6,769,446 B1 | 8/2004 | Ball et al. |
| 6,830,063 B1 | 12/2004 | Ball |
| 6,883,534 B2 | 4/2005 | Ball et al. |
| 6,935,358 B1 * | 8/2005 | Hoeptner, III ............... 137/218 |
| 7,140,390 B2 | 11/2006 | Berkman et al. |
| 2002/0167164 A1 | 11/2002 | Thomas et al. |
| 2005/0161087 A1 * | 7/2005 | Brattoli et al. ............... 137/360 |
| 2007/0193626 A1 * | 8/2007 | Pulver et al. ................. 137/360 |

OTHER PUBLICATIONS

Four (4) pages from website: http://doityourself.com, printed on Oct. 31, 2003.
Office Action dated May 1, 2007 in U.S. Appl. No. 11/036,730.
Amendment filed Nov. 1, 2007 in U.S. Appl. No. 11/036,730.
Office Action dated Jan. 23, 2008 in U.S. Appl. No. 11/036,730.
Request for Continued Examination and Amendment filed May 14, 2008 in U.S. Appl. No. 11/036,730.
Office Action dated Jul. 30, 2008 in U.S. Appl. No. 11/036,730.
Amendment filed Dec. 1, 2008 in U.S. Appl. No. 11/036,730.
Notice of Allowance dated Jan. 13, 2009 in U.S. Appl. No. 11/036,730.

* cited by examiner

BACKPRESSURE RELIEF VALVE

RELATED APPLICATION

This application claims the benefit of U.S. provisional Application No. 60/757,803 filed Jan. 10, 2006, the entire disclosure of which is incorporated herein by reference.

TECHNICAL FIELD

The present invention is generally related to a sillcock for supplying varying amounts of water at various temperatures to the exterior of a building. More particularly, the present invention is related to a sillcock incorporating a device serving to prevent water from being forced backwardly through the sillcock if there is a water pressure loss upstream thereof. More specifically, the present invention is related to a sillcock incorporating a backpressure relief valve allowing water to be expelled from the sillcock before being forced backwardly through the sillcock.

BACKGROUND

Sillcocks are used to supply water to the exteriors of buildings. Furthermore, garden hoses are oftentimes attached to the spouts of sillcocks, and nozzles are oftentimes attached to the garden hoses. Because the nozzles are equipped with on/off controls, sillcocks can be left in the on position, and the nozzles can be used to control the flow of water exiting the garden hoses. If there is a water pressure loss upstream of the sillcocks, however, possibly contaminated water can be forced backwardly from the garden hoses into the sillcocks. Depending on the amount of backpressure, the contaminated water may be forced through the sillcocks into the water supply of the building. Check seals have been used to inhibit backpressure from causing the possibly contaminated water to flow backwardly through the sillcocks, when there is a water pressure loss upstream of the sillcocks. However, the code requirements of many municipalities require that sillcocks be equipped to relieve backpressure, and, in doing so, prevent possibly contaminated water from being forced backwardly therethrough. Therefore, there is a need for a device for relieving backpressure in sillcocks.

SUMMARY

One aspect provides a valve assembly comprising a backpressure relief valve for relieving backpressure in a sillcock. The backpressure relief valve includes a deformable member operable to contract to allow water to be expelled from the sillcock if backpressure is present.

Another aspect provides a valve assembly comprising a cartridge assembly and a backpressure relief valve for relieving backpressure in a sillcock. The cartridge assembly includes an inner shell and an outer shell. The backpressure relief valve includes a deformable member operable to allow water to be expelled from the sillcock. The backpressure relief valve is disposed between the inner shell and the outer shell.

Another aspect provides a sillcock comprising a valve body, a valve assembly disposed within the valve body, and a backpressure relief valve for relieving backpressure in the sillcock. The valve assembly includes a cartridge assembly and the backpressure relief valve is disposed within the cartridge assembly. The backpressure relief valve includes a deformable member operable to contract to allow water to be expelled from the sillcock if backpressure is present.

DETAILED DESCRIPTION

Figure 1:
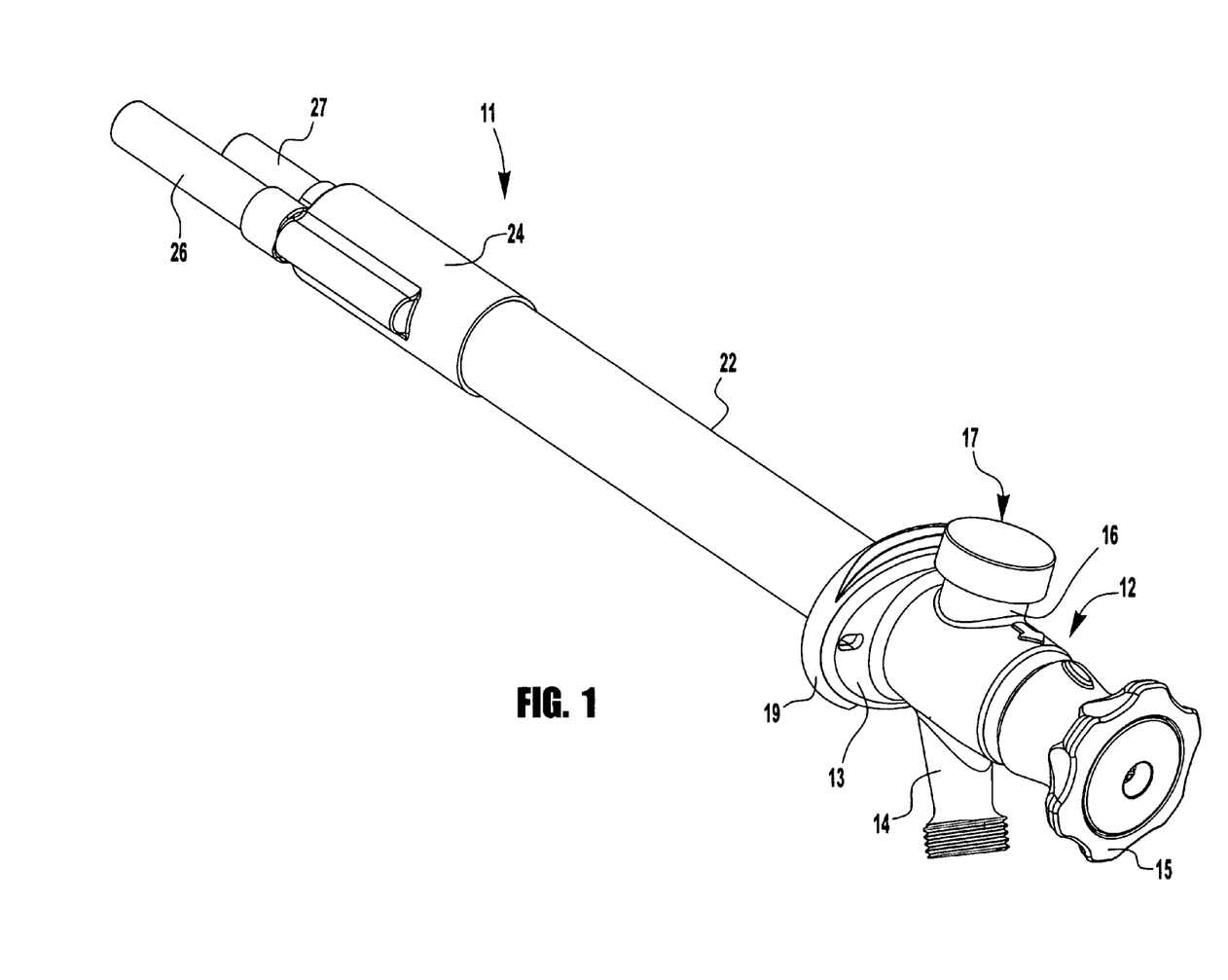
FIG. 1 is a perspective view of a sillcock incorporating a backpressure relief valve of the present invention.
Figure 2:
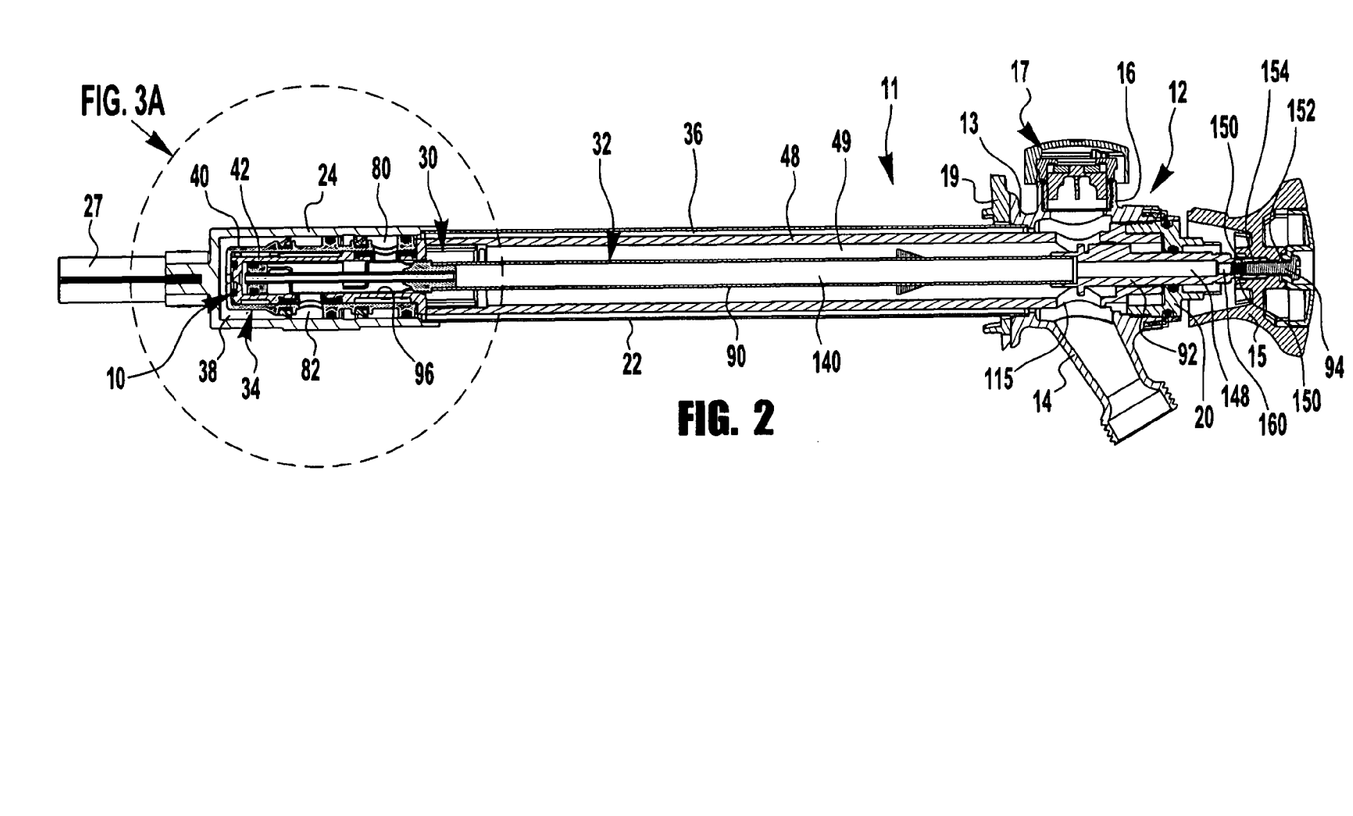
FIG. 2 is a cross-sectional view of the sillcock shown in FIG. 1 including an exterior assembly, an actuation assembly, and a cartridge assembly incorporating an outer shell and an inner shell.

A sillcock incorporating a backpressure relief valve 10 is generally indicated by the numeral 11 in the accompanying drawings. The sillcock 11 is provided for supplying varying amounts of water at various temperatures to the exterior of a building (not shown). For example, as depicted in FIGS. 1 and 2, the sillcock 11 includes an exterior assembly generally indicated by the numeral 12. The exterior assembly 12 includes an escutcheon assembly 13, a spout 14, a knob assembly 15, and a vacuum-breaker extension 16. The exterior assembly 12 can be disposed on the exterior of the building, and the remainder of the sillcock 11 can extend through a wall (not shown) toward the interior of the building.

As depicted in FIGS. 1 and 2, the vacuum-breaker extension 16 serves in housing a vacuum-breaker assembly 17. Furthermore, the spout 14 is provided to deliver water, and, as discussed below, the knob assembly 15 is provided for controlling both the volume and temperature of the water exiting the spout 14. Moreover, as depicted in FIG. 2, the escutcheon assembly 13 includes a wall plate 19 that can be fixedly attached to the wall of the building, and includes an escutcheon nut 20 serving to support components on the interior of the sillcock 11.

As depicted in FIGS. 1 and 2, a sillcock tube 22 extends rearwardly from the escutcheon assembly 13. Furthermore, a valve body 24 is provided on the end of the sillcock tube 22 opposite from the escutcheon assembly 13. The valve body 24 is attached to a hot-water conduit 26 and a cold-water conduit 27. As discussed below, the interior of the sillcock 11 includes a valve assembly 30 (FIGS. 2-5) provided inside the sillcock tube 22 and valve body 24. The valve assembly 30 is used to control the volume and temperature of water exiting the spout 14. As depicted in FIG. 2, the valve assembly 30 includes an actuation assembly 32 and a cartridge assembly 34. The sillcock tube 22 defines a cavity 36 for receiving portions of the actuation assembly 32 and cartridge assembly 34, and the valve body 24 defines a valving area 38 for receiving the other portions of the actuation assembly 32 and cartridge assembly 34.

As depicted in FIGS. 2-5, the cartridge assembly 34 includes an outer shell 40 and an inner shell 42. The outer shell 40 and inner shell 42 can be cup-shaped, and the inner shell 42 is received within the outer shell 40. The outer shell 40 can include a base 44 and a sidewall 45 extending outwardly from the base 44, and the inner shell 42 can include a base 46 and a sidewall 47 extending outwardly from the base 46. To maintain the position of the outer shell 40 and inner shell 42 relative to one another, and to the sillcock tube 22 and valve body 24, the outer shell 40 and inner shell 42 are specially configured, and a retainer 48 is provided. As discussed below, water from the cartridge assembly 34 is directed through an interior cavity 49 of the retainer 48 toward the spout 14.

To inhibit rotational movement of the outer shell 40 and inner shell 42 relative to one another, ears 50 and 51 (FIG. 3A) formed on the sidewall 47 of the inner shell 42 are received within slots 52 and 53, respectively, provided in sidewall 45 of the outer shell 40. The slots 52 and 53 provided in the sidewall 45 of the outer shell 40 extend in axial directions. Therefore, when the ears 50 and 51 are inserted into the slots 52 and 53, respectively, the outer shell 40 and inner shell 42 are inhibited from rotational movement relative to one another, but can be repositioned axially. To inhibit axial movement of the outer shell 40 and inner shell 42 relative to one another, ears 54 and 55 (FIG. 3B) formed on the sidewall 45 of the outer shell 40 are received within slots 56 and 57, respectively, provided in the retainer 48. The slots 56 and 57 provided in the retainer 48 extend in axial and rotational directions. Therefore, when the ears 54 and 55 formed on the sidewall 45 of the outer shell 40 are inserted into the slots 56 and 57, respectively, the outer shell 40 and the inner shell 42 received therein can be repositioned axially and rotationally with respect to the retainer 48. Because of the configuration of the slots 56 and 57, fully inserting the ears 54 and 55 therein repositions the outer shell 40 and the inner shell 42 received therein so that an end 60 of the retainer 48 is positioned adjacent the ears 50 and 51 of the inner shell 42. As such, the interaction between the ears 54 and 55 with the slots 56 and 57 serves to clamp the inner shell 42 within the outer shell 40, and, in doing so, inhibit axial movement of the outer shell 40 and inner shell 42 relative to one another. The interaction between the ears 54 and 55 with the slots 56 and 57 also attaches the outer shell 40 and inner shell 42 received therein to the retainer 48. Consequently, because the retainer 48 is attached to the escutcheon assembly 13, the interaction between the ears 54 and 55 with the slots 56 and 57 also serves in maintaining the position of the outer shell 40 and inner shell 42 relative to the sillcock tube 22 and valve body 24.

Figure 3A:
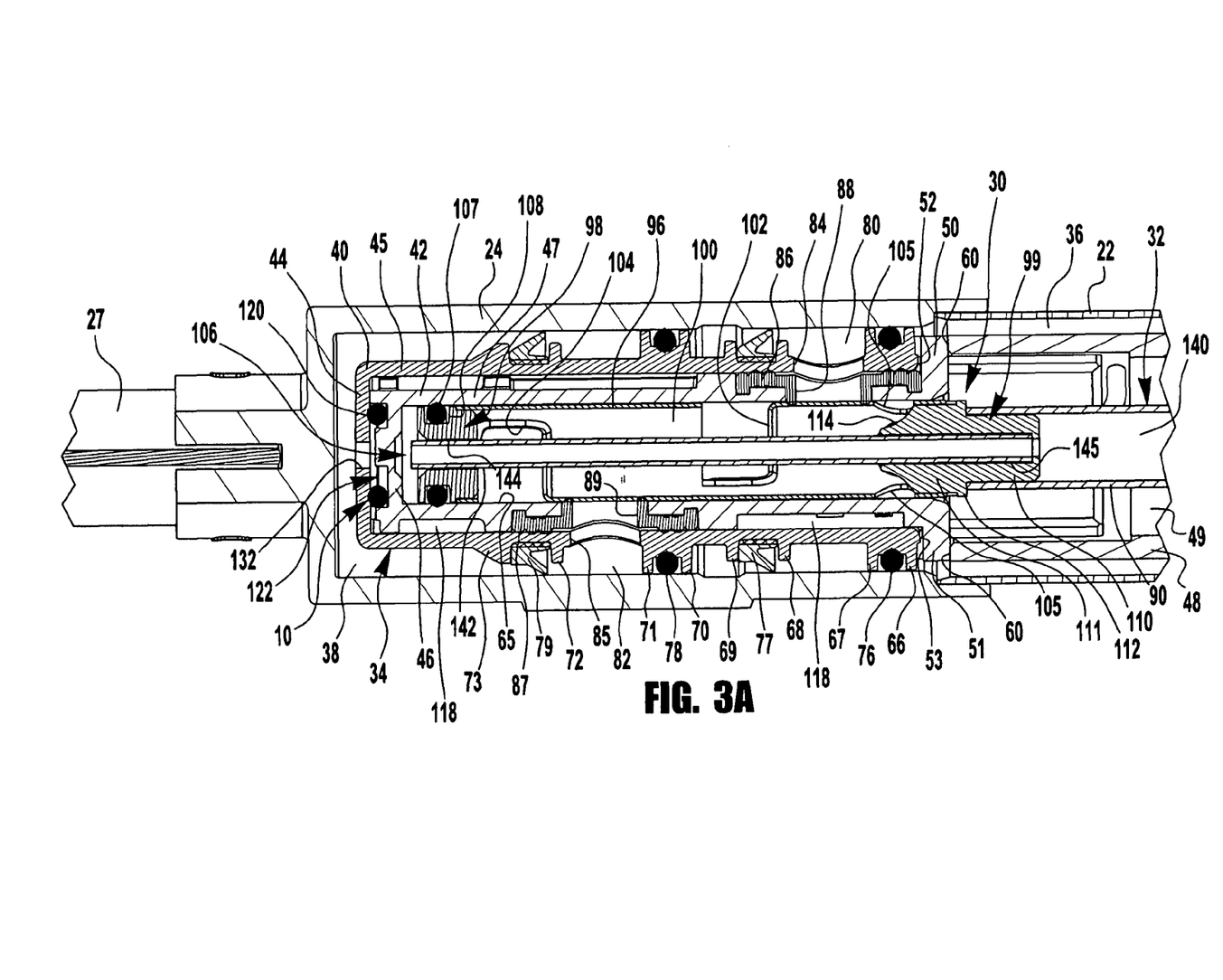
FIG. 3A is an enlarged cross-sectional view of the sillcock shown in FIG. 2 depicting the cartridge assembly.
Figure 3B:
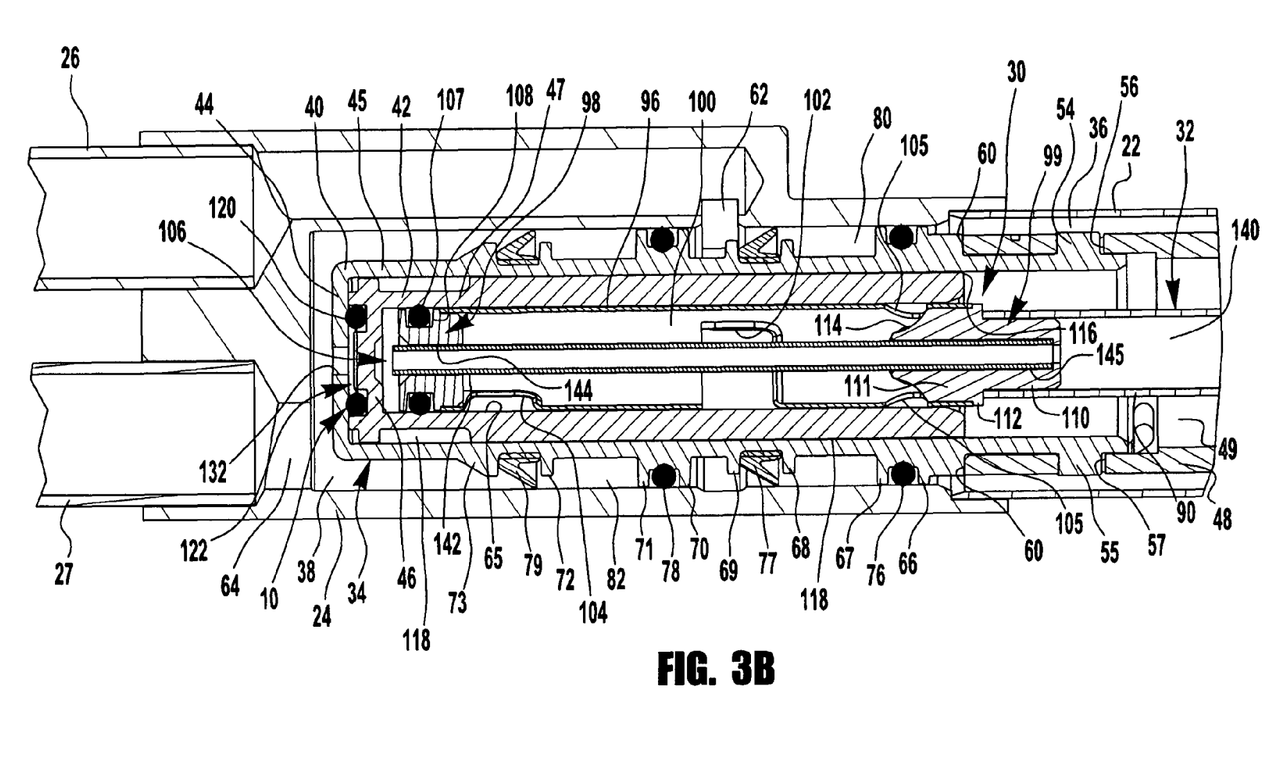
FIG. 3B is an enlarged cross-sectional view of the sillcock orthogonal to the cross-sectional view shown in FIG. 3A depicting the cartridge assembly.

As depicted in FIG. 3B, the hot-water conduit 26 and cold-water conduit 27 can communicate with the valving area 38 via a hot-water inlet 62 and a cold-water inlet 64, respectively, and the configuration of cartridge assembly 34 serves in directing hot and cold water toward an interior 65 of the inner shell 42. For example, as depicted best in FIGS. 3A and 3B, the exterior of the sidewall 45 includes a first flange 66, a second flange 67, a third flange 68, a fourth flange 69, a fifth flange 70, a sixth flange 71, a seventh flange 72 and an eighth flange 73. The first flange 66 and second flange 67 receive an o-ring 76 therebetween, and the third flange 68 and fourth flange 69 receive a check seal 77 therebetween. Furthermore, the fifth flange 70 and sixth flange 71 receive an o-ring 78 therebetween, and the seventh flange 72 and eighth flange 73 receive a check seal 79 therebetween. The o-rings 76 and 78 provide for an interference fit between the valve body 24 and outer shell 40, and inhibit the flow of water therearound. The o-ring 76 and check seal 77 define a hot-water chamber 80 therebetween for receiving hot water from the hot-water inlet 62, and the o-ring 78 and check seal 79 define a cold-water chamber 82 for receiving cold water from the cold-water inlet 64. When hot water enters the valving cavity 38 via the hot-water inlet 62, the check seal 77 allows the hot water to enter the hot-water chamber 80, and when cold water enters the valving cavity 38 via the cold-water inlet 64, the check seal 79 allows the cold water to enter the cold-water chamber 82. The o-ring 76 serves in preventing the hot water from exiting the hot-water chamber 80, and the o-ring 78 serves in preventing the hot water entering the valving cavity 38 from mixing with the cold water in the cold-water chamber 82.

Figure 4:
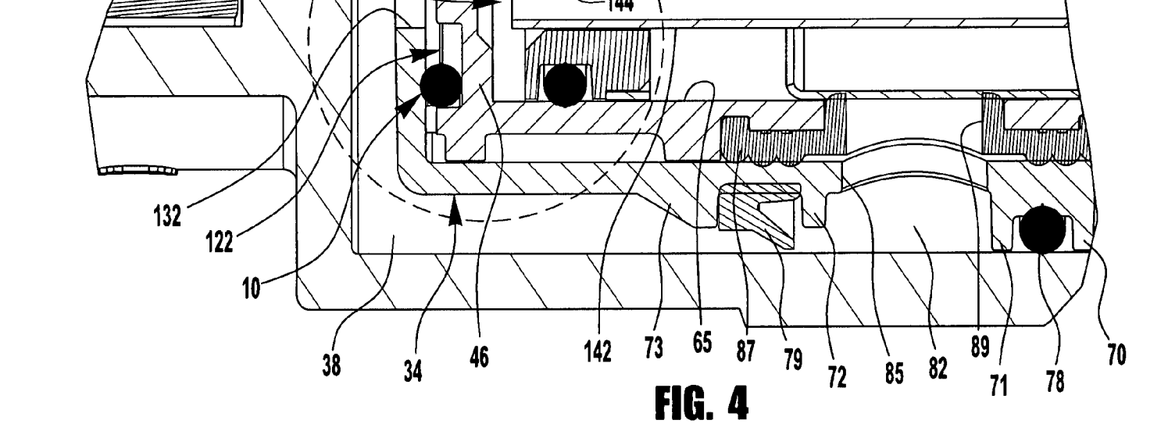
FIG. 4 is a further enlarged cross-sectional view of the sillcock shown in FIG. 3A depicting the backpressure relief valve.

As depicted in FIG. 3A, a first hot-water aperture 84 is formed through the sidewall 45 adjacent the hot-water chamber 80, and, as depicted in FIGS. 3A and 4, a first cold-water aperture 85 is formed through the sidewall 45 adjacent the cold-water chamber 82. A hot-water grommet 86 is provided on the inner shell 42 adjacent the first hot-water aperture 84 and a cold-water grommet 87 is provided on the inner shell 42 adjacent the first cold-water aperture 85. The hot-water grommet 86 and cold-water grommet 87 are sandwiched between the outer shell 40 and inner shell 42 to provide for an interference fit therebetween. The hot-water grommet 86 and cold-water grommet 87 also define a second hot-water aperture 88 and a second cold-water aperture 89, respectively. As such, the hot-water chamber 80 can communicate with the interior 65 of inner shell 42 via the first and second hot-water apertures 84 and 88, and the cold-water chamber 82 can communicate with the interior 65 of the inner shell 42 via the first and second cold-water apertures 85 and 89.

The hot water and cold water directed toward the interior 65 of the inner shell 42 are manipulated by the actuation assembly 32 according to actuation of the knob assembly 15 to control the volume and temperature of the water exiting the spout 14. For example, the actuation assembly 32 includes a stem 90 and a stem coupler 92. The stem 90 extends through the interior cavity 49 of the retainer 48, and the stem coupler 92 is supported relative to the sillcock tube 22 by the escutcheon nut 20. The stem 90 is operatively interconnected by the stem coupler 92 (FIG. 2) to the knob assembly 15. Furthermore, the knob assembly 15 is attached to the stem coupler 92 via a mechanical fastener 94. To attach the knob assembly 15 to the stem coupler 92, the mechanical fastener 94 is received within a threaded aperture 152 provided in the knob assembly 15, and within a threaded aperture 154 provided in the stem coupler 92. As such, the stem 90 is capable of axial movement via inward and outward movement of the knob assembly 15, and capable of rotational movement via rotational movement of the knob assembly 15.

As depicted best in FIGS. 3A and 3B, the actuation assembly 32 also includes a piston 96 received in the cartridge assembly 34. The piston 96 is operatively interconnected with the knob assembly 15 via the stem 90 and stem coupler 92. The piston 96 is moveable axially and rotationally within the interior 65 of the inner shell 42. Movement of the piston 96 axially and rotationally relative to the cartridge assembly 34 serves to control the volume and temperature, respectively, of the water exiting the cartridge assembly 34. As such, actuation of the knob assembly 15 serves to control the axial and rotational position of the piston 96 relative to the cartridge assembly 34, and, in doing so, control the volume and temperature of the water exiting the cartridge assembly 34.

As depicted best in FIGS. 3A and 3B, the piston 96 includes a first end plug 98 and a second end plug 99 defining a mixing area 100 therebetween. Furthermore, the piston includes a hot-water aperture 102, a cold-water aperture 104, and exit openings 105.

Depending on the rotational position of the piston 96 relative to the cartridge assembly 34, varying proportions of hot water and cold water are allowed to enter the mixing area 100. For example, depending on the rotational position of the piston 96 relative to the cartridge assembly 34, varying proportions of communication are afforded between the hot-water aperture 102 and the first and second hot-water apertures 84 and 88, and between the cold-water aperture 104 and the first and second cold-water apertures 85 and 89. As such, the rotational position of the piston 96 relative to the cartridge assembly 34 as afforded by rotation of the knob assembly 15 serves to allow varying proportions of hot water and cold water to mix in the mixing area 100.

Furthermore, depending on the axial position of the piston 96 relative to the cartridge assembly 34, varying amounts of water enter the piston 96. For example, depending on the axial position of the piston relative to the cartridge assembly 34, the hot-water aperture 102 and cold-water aperture 104 are uncovered to afford varying amounts of communication with the mixing area 100. The hot-water grommet 86 and cold-water grommet 87 seal against the piston 96, and prevent hot water and cold water from entering the mixing chamber 100 when the hot-water aperture 102 and cold-water aperture 104 are covered. However, as the hot-water aperture 102 and cold-water aperture 104 are uncovered, greater amounts of hot water and cold water can enter the piston 96. If the rotational position of the piston 96 remains unchanged during axial movement of the piston 96 that uncovers the hot-water aperture 102 and cold-water aperture 104, the proportions of hot water and cold water entering the piston 96 will remain unchanged. As such, the axial position of the piston 96 relative to the cartridge assembly 34 as afforded by axial (i.e. inward and outward) movement of the knob assembly 15 closes and opens the sillcock, respectively, and, in doing so, serves to allow varying amounts of mixed water to exit the piston 96.

The first end plug 98 is provided at one end of the piston 96, and serves to inhibit water from the mixing area 100 from entering a vent chamber or water collection chamber 106 formed in the cartridge assembly 34. The water collection chamber 106 increases and decreases in size according to the axial position of the piston 96 relative to the cartridge assembly 34, and, as discussed below, serves in collecting water if backpressure is present in the sillcock 11. An o-ring 107 is provided in an annular recess 108 around the first end plug 98, and provides for an interference fit between the inner shell 42 and first end plug 98 that inhibits the flow of water therearound. As such, the water provided in the mixing area 100 is inhibited by the o-ring 107 from mixing with water received in the water collection chamber 106.

The second end plug 99 is provided at the other end of the piston 96 to connect the piston 96 to the stem 90, and to direct water exiting the mixing area 100 into the interior cavity 49 of the retainer 48. For example, the second end plug 99 includes a first portion 110, a second portion 111, and a rim 112 formed between the first portion 110 and second portion 111. The first portion 110 is received within the stem 90 and can be adhesively or otherwise secured thereto. Furthermore, the second portion 111 is received within the piston 96 and can be adhesively or otherwise secured thereto. As depicted best in FIGS. 3A and 3B, the rim 112 abuts the ends of the stem 90 and piston 96 through which the first portion 110 and second portion 111 are received, respectively. Furthermore, the second end plug 99 includes a frusto-conical surface 114 formed on the second portion 111, and positioned adjacent the exit holes 105. The frusto-conical surface 114 serves to direct water from the mixing area 100 through the exit holes 105 into the interior cavity 49 of the retainer 48. Thereafter, water is transferred through the interior cavity 49 of the retainer 48 through an aperture 115 into the spout 14, so that water can exit the sillcock 11.

If backpressure is present in the sillcock 11, the check seal 77, check seal 79, and backpressure relief valve 10 serve in inhibiting possibly contaminated water from being forced backwardly through the sillcock 11. For example, if the sillcock 11 is attached to a garden hose (not shown) that is filled with possibly contaminated water, and the sillcock is left opened, the check seal 77 and check seal 79 inhibit the possibly contaminated water from being forced backwardly through the sillcock 11 when there is a pressure loss in the hot-water conduit 26 and cold-water conduit 27. As such, the check seal 77 inhibits the possibly contaminated water from being forced backwardly through the hot-water chamber 80 into the hot-water conduit 26, and the check seal 79 inhibits the possibly contaminated water from being forced backwardly through the cold-water chamber 82 into the cold-water conduit 27.

In addition, the backpressure relief valve 10 serves to further inhibit possibly contaminated water from being forced past the check seal 77 and check seal 79 by relieving backpressure. For example, even during normal operation of the sillcock 11 (when no backpressure is present in the sillcock 11), water can enter at 116 between the outer shell 40 and inner shell 42. However, when backpressure is present in the sillcock 11, possibly contaminated water from the garden hose, rather than being forced backwardly through the sillcock 11 past the check seal 77 and check seal 79, can enter at 116 into water collection areas 118 provided between the inner shell 40 and outer shell 42. The backpressure relief valve 10 allows the water collected in the water collection areas 118 to then be expelled from the sillcock 11. As such, the backpressure relief valve 10 serves in expelling the possibly contaminated water collected in the water collection areas 118 between the outer shell 40 and inner shell 42 to prevent such water from being forced past the check seal 77 and check seal 79, and, in doing so, relieves the backpressure in the sillcock 11.

Figure 5:
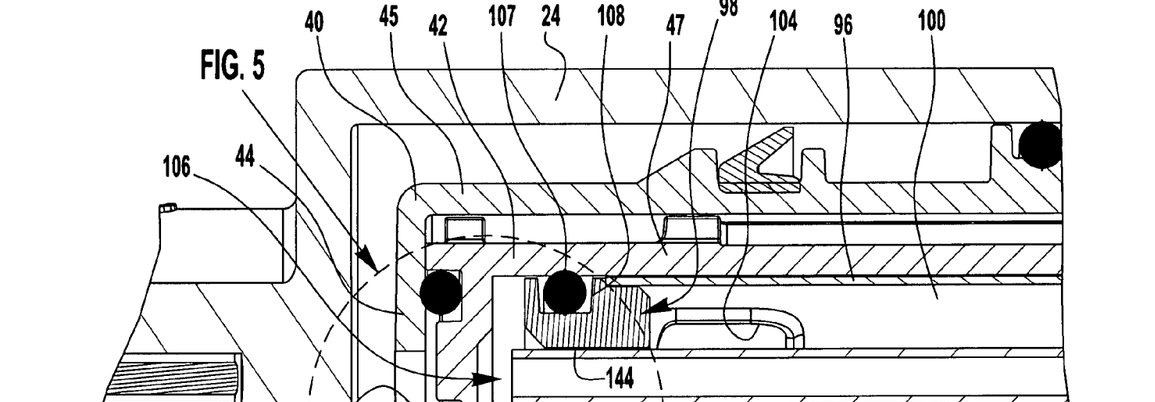
FIG. 5 is a further enlarged cross-sectional view of the sillcock shown in FIG. 4 depicting the backpressure relief valve.

As depicted best in FIG. 5, the backpressure relief valve 10 includes a deformable member operable to allow water to be expelled from the sillcock if backpressure is present. In one embodiment, the deformable member is an o-ring 120. However, one of ordinary skill in the art will appreciate that other forms of deformable members that are operable to allow water to be expelled from the sillcock if backpressure is present could also be used.

Figure 6:
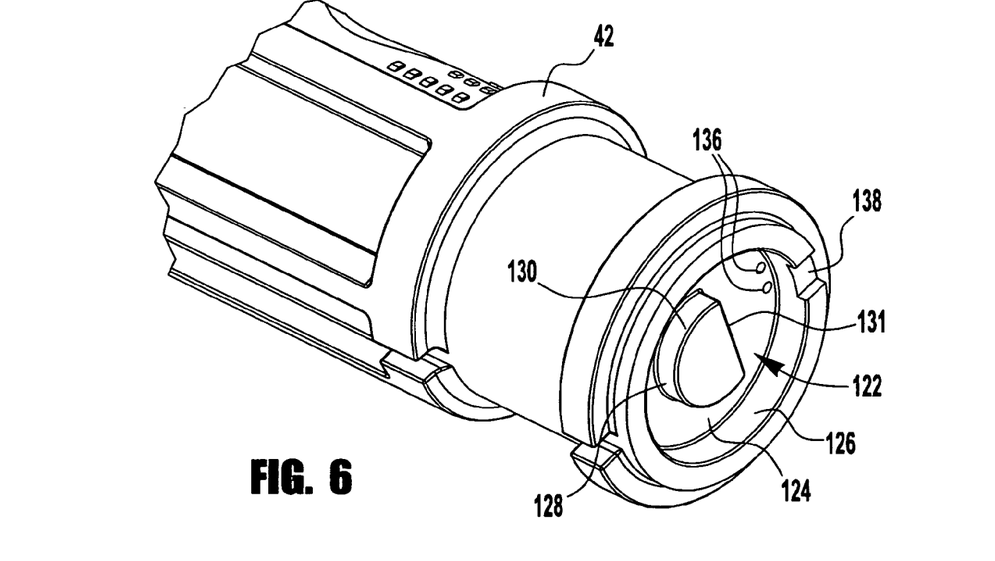
FIG. 6 is a perspective view of the end portion of the inner shell of the cartridge assembly shown in FIG. 5.

The o-ring 120 is disposed within a recess 122 provided in the end portion of the inner shell 42. The recess 122 is formed in the base 46 of the inner shell 42, and, as depicted in FIGS. 5 and 6, is defined by a wall 124, an outer sidewall 126 and an inner sidewall 128. The outer sidewall 126 can have a cylindrical shape, and the inner wall 128 can include a semi-cylindrical segment 130 and a chordal segment 131. The o-ring 120 is provided in the recess 122 between the outer sidewall 126 and inner sidewall 128, and forms an interference fit between the base 44 of the outer shell 40 and base 46 of the inner shell 42.

The o-ring 120 can expand and contract between a first position P1 adjacent the inner sidewall 128 when backpressure is present (for example, in this embodiment, corresponding to pressure loss in the cold-water conduit 27), and a second position P2 adjacent the outer sidewall 126 when backpressure is not present. An aperture 132 is provided in the base 44 of the outer shell 40, and, when backpressure is not present, water is compelled through the aperture 132. Because of a gap G provided between the base 44 and base 46, water from the aperture 132 can enter the recess 122. Water compelled through the aperture 132, and provided between the o-ring 120 and inner sidewall 128 serves to expand the o-ring 120 from the first position P1 to the second position P2. Otherwise, without the water compelled through the aperture 132, and provided between the o-ring 120 and inner sidewall 128, the o-ring 120 returns to the first position P1.

Under normal operation of the sillcock 11, the o-ring 120 is expanded into the second position P2 by the water compelled through the aperture 132. In the second position P2, the o-ring 120 seals around the perimeter of the recess 122, and, in doing so, inhibits communication of openings in the form of apertures 136 provided through the base 46 with another opening in the form of a groove 138 provided in the base 46. The apertures 136 are formed through the base 46, and allow for communication of the recess 122 with the water collection chamber 106 formed in the cartridge assembly 34. The groove 138 is formed in the base 46 adjacent the perimeter of the recess 122. The groove 138 allows for communication of the recess 122 with the water collection areas 118 formed between the outer shell 40 and inner shell 42. In the second position P2, the communication between the apertures 136 and groove 138 is inhibited, and, therefore, communication between the water collection chamber 106 and recess 122 is also inhibited.

However, when backpressure is present (corresponding to pressure loss in the sillcock) causing the o-ring 120 to return to the first position P1, communication is afforded between the apertures 136 and groove 138 via the recess 122. The chordal segment 131 is provided to insure that, when in position P1, the o-ring 120 is sufficiently deformed to allow communication between the apertures 136 and groove 138 via the recess 122. As such, when the o-ring 120 is in position P1, the possibly contaminated water collected in the water collection areas 118 which is subject to the backpressure can be transferred into the water collection chamber 106. Thereafter, the water provided in the water collection chamber 106 can, as discussed below, be expelled from the sillcock 11 through the actuation assembly 32.

A shape of the inner sidewall 128 causes the o-ring 120 to contract in a non-uniform manner. For example, with the semi-cylindrical segment 130 and the chordal segment 131, the o-ring will contract to a shape that generally corresponds to the perimeter of the semi-cylindrical segment 130 and the chordal segment 131. Thus, a portion of the o-ring adjacent the perimeter of the semi-cylindrical segment 130 will not contract as much as a portion of the o-ring 120 adjacent the chordal segment 131. One of ordinary skill in the art will appreciate that the inner sidewall 128 could have other shapes that permit the o-ring 120 to contract in a non-uniform manner.

As depicted in FIGS. 2, 3A and 3B, the stem 90 includes an interior cavity 140, and a tube 142 extends through the piston 96 between the first end plug 98 and second end plug 99. The tube 142 is received in an aperture 144 extending through the first end plug 98, and is received in an aperture 145 extending through the second end plug 99. The tube 142 allows for communication between the water collection chamber 106 and the interior cavity 140. Furthermore, as depicted in FIG. 2, the interior cavity 140 communicates with an interior cavity 148 formed in the stem coupler 92, and the interior cavity 148 of the stem coupler 92 communicates with the atmosphere via vent holes 150. The vent holes 150 allow water from the water collection chamber 106 to be expelled from the sillcock 11. The vent holes 150 communicate with the threaded aperture 154 in the stem coupler 92. Furthermore, the threaded aperture 154 communicates with the interior cavity 148 via an interconnection cavity 160 formed in the stem coupler 92. As such, the interior cavity 148 communicates with the vent holes 150 via the threaded aperture 154 and the interconnection cavity 160.

The possibly contaminated water from the water collection chamber 106 can be transferred from the tube 142 into the interior cavity 140 and interior cavity 148. Subsequently, the water provided in the interior cavity 148 can be transferred into the threaded aperture 154 via the interconnection cavity 160, and then be expelled from the sillcock 11 through the vent holes 150. As such, the backpressure relief valve 10 relieves backpressure, and, in doing so, allows (through deformation of the o-ring 120) the possibly contaminated water collected between the outer shell 40 and inner shell 42 to be expelled through the actuation assembly 32 to the atmosphere via the vent holes 150, so that such water is prevented from being forced past the check seal 77 and check seal 79.

While in accordance with the Patent Statutes, only the best mode and exemplary embodiments have been presented and described in detail, it is to be understood that the invention is not limited thereto or thereby.

The invention claimed is:

1. A valve assembly comprising:
   a cartridge assembly for placement in a conduit of a sillcock to control at least one of a flow rate and a temperature of water flowing through the conduit; and
   a backpressure relief valve for relieving backpressure in the sillcock, the backpressure relief valve including a deformable member operable to contract to allow water to be expelled from the sillcock if backpressure is present,
   wherein the cartridge assembly includes an inner shell and an outer shell, and
   wherein the deformable member is disposed between an outer surface of the inner shell and an inner surface of the outer shell.

2. The backpressure relief valve of claim 1, wherein the deformable member is an o-ring.

3. The backpressure relief valve of claim 1, wherein:
   the deformable member contracts if backpressure is present; and
   the deformable member expands if backpressure is absent.

4. The backpressure relief valve of claim 1, wherein the deformable member contracts in a non-uniform manner.

5. A valve assembly, comprising:
   a cartridge assembly, the cartridge assembly including an inner shell and an outer shell; and
   a backpressure relief valve for relieving backpressure in a sillcock, the backpressure relief valve including a deformable member operable to contract to allow water to be expelled from the sillcock if backpressure is present;
   wherein the deformable member is disposed between the inner shell and the outer shell;
   wherein the inner shell includes a wall, an outer sidewall, and an inner sidewall;
   wherein the wall, the outer sidewall, and the inner sidewall define a recess; and
   wherein the deformable member is disposed in the recess.

6. The valve assembly of claim 5, wherein:
   the inner shell includes a base;
   the outer shell includes a base; and
   the deformable member forms an interference fit between the base of the inner shell and the base of the outer shell.

7. The valve assembly of claim 5, wherein:
   the deformable member is in a first position adjacent the inner sidewall if backpressure is present; and
   the deformable member is in a second position adjacent the outer sidewall if backpressure is absent.

8. The valve assembly of claim 5, wherein:
the wall includes an aperture;
the outer sidewall includes a groove; and
the groove communicates with the aperture via the recess.

9. The valve assembly of claim 8, further comprising:
an actuation assembly, the actuation assembly including a piston; wherein:
a water collection area is formed between the inner shell and the outer shell;
a vent chamber is formed between the inner shell and the piston;
the water collection area communicates with the recess via the groove; and
the recess communicates with the vent chamber via the aperture.

10. The valve assembly of claim 9, wherein:
a tube extends through the piston; and
the vent chamber communicates with the tube.

11. The valve assembly of claim 5, wherein:
the inner sidewall includes a semi-cylindrical segment and a chordal segment.

12. A sillcock, comprising:
a valve body;
a valve assembly disposed within the valve body, the valve assembly including a cartridge assembly;
a backpressure relief valve disposed within the cartridge assembly for relieving backpressure in the sillcock;
the backpressure relief valve including a deformable member operable to contract to allow water to be expelled from the sillcock if backpressure is present;
wherein the cartridge assembly includes an inner shell and an outer shell;
wherein the deformable member is disposed between the inner shell and the outer shell;
wherein the deformable member contracts if backpressure is present; and
wherein the deformable member expands if backpressure is absent.

13. The sillcock of claim 12, wherein the deformable member contracts in a non-uniform manner.

14. The sillcock of claim 12, wherein:
the inner shell includes a recess; and
the deformable member is disposed in the recess.

15. The valve assembly of claim 14, wherein:
the inner shell includes a base;
the outer shell includes a base; and
the deformable member forms an interference fit between the base of the inner shell and the base of the outer shell.

16. The sillcock of claim 14, wherein:
the inner shell includes a wall, an outer sidewall, and an inner sidewall;
the wall, the outer sidewall, and the inner sidewall define the recess;
the deformable member is in a first position adjacent the inner sidewall if backpressure is present; and
the deformable member is in a second position adjacent the outer sidewall if backpressure is absent.

17. The sillcock of claim 16, further comprising:
an actuation assembly, the actuation assembly including a piston; wherein:
the wall includes an aperture;
the outer sidewall includes a groove;
a water collection area is formed between the inner shell and the outer shell;
a vent chamber is formed between the inner shell and the piston;
the groove communicates with the aperture via the recess;
the water collection area communicates with the recess via the groove; and
the recess communicates with the vent chamber via the aperture.

* * * * *